(12) United States Patent
Piccinini et al.

(10) Patent No.: US 8,291,471 B2
(45) Date of Patent: Oct. 16, 2012

(54) MANAGING DOCUMENT ACCESS

(75) Inventors: Sandro Piccinini, Rome (IT); Luigi Pichetti, Rome (IT); Marco Secchi, Rome (IT); Antonio Secomandi, Milan (IT)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 12/419,011

(22) Filed: Apr. 6, 2009

(65) Prior Publication Data

US 2009/0257596 A1   Oct. 15, 2009

(30) Foreign Application Priority Data

Apr. 15, 2008 (EP) .................................. 08154508

(51) Int. Cl.
*H04L 29/06* (2006.01)

(52) U.S. Cl. ......... 726/2; 726/3; 726/4; 726/26; 726/27; 726/30; 707/705; 707/758; 707/600; 707/692; 707/802; 709/217; 709/232; 713/165; 713/179; 713/181

(58) Field of Classification Search ....... 726/2; 713/156
See application file for complete search history.

(56) References Cited

U.S. PATENT DOCUMENTS

| | | | |
|---|---|---|---|
| 7,058,630 B2 | 6/2006 | Houston et al. | |
| 7,254,772 B2 | 8/2007 | Penke et al. | |
| 7,668,873 B2 * | 2/2010 | Davis et al. | 707/802 |
| 7,882,068 B2 * | 2/2011 | Schack et al. | 707/639 |
| 7,971,021 B2 * | 6/2011 | Daud et al. | 711/167 |
| 8,015,194 B2 * | 9/2011 | Wolff et al. | 707/758 |
| 8,161,527 B2 * | 4/2012 | Curren | 726/2 |
| 2003/0110131 A1 * | 6/2003 | Alain et al. | 705/51 |
| 2003/0182578 A1 * | 9/2003 | Warnock et al. | 713/201 |
| 2009/0177248 A1 | 9/2003 | Brown et al. | |
| 2004/0003053 A1 * | 1/2004 | Williams | 709/217 |
| 2004/0006575 A1 * | 1/2004 | Visharam et al. | 707/104.1 |
| 2006/0167737 A1 | 7/2006 | Muller et al. | |
| 2007/0033637 A1 | 2/2007 | Yami et al. | |
| 2007/0118554 A1 * | 5/2007 | Chang et al. | 707/102 |
| 2007/0198612 A1 * | 8/2007 | Prahlad et al. | 707/204 |
| 2007/0234218 A1 | 10/2007 | Baschy | |
| 2008/0183691 A1 * | 7/2008 | Kwok et al. | 707/5 |
| 2009/0024648 A1 * | 1/2009 | Heix et al. | 707/102 |
| 2010/0332454 A1 * | 12/2010 | Prahlad et al. | 707/654 |
| 2010/0333116 A1 * | 12/2010 | Prahlad et al. | 719/328 |

FOREIGN PATENT DOCUMENTS

| | | |
|---|---|---|
| EP | 1225500 A2 | 7/2002 |
| EP | 1320011 A2 | 6/2003 |

OTHER PUBLICATIONS

Written Opinion, International Searching Authority.

* cited by examiner

*Primary Examiner* — Syed A. Zia
(74) *Attorney, Agent, or Firm* — D'Ambrosio & Menon, PLLC

(57) ABSTRACT

Methods, computer program products and systems for protecting a document from access by one or more users based on one or more document access rules. In one embodiment, the method includes creating a data set representing the one or more document access rules, storing the document and the associated data set, determining and storing a key for opening the document when one or more document access rules from the data set are met, and releasing the key to open the document to one or more users in response to a request from a user which meets one or more document access rules, thereby enabling the user to access the document.

18 Claims, 3 Drawing Sheets

MANAGING DOCUMENT ACCESS

PRIORITY

This application is based on and claims the benefit of priority from European Patent Application EP08154508.9 filed Apr. 15 2008.

BACKGROUND

Most companies and organizations employ a central repository for storing documents. Access to such a central repository is typically based on a user identifier. This means that all authorized users can access any document at any time. If a user wishes a document to be restricted in some manner the user typically is required to make the document private. If the user then later wishes to permit access to the document, the user must change the document properties and permissions.

SUMMARY OF THE INVENTION

One or more embodiments of the invention are directed to a method, system and computer program product for managing user access to documents.

Since authorized users can access documents at any time, the inadvertent disclosure of confidential documents, in particular, can jeopardize intellectual property rights, commercial and business opportunities and in some cases can have huge financial impact. In one embodiment of the invention, a method of managing access to a document comprises creating a data set representing one or more document access rules; storing the document and the representative data set; determining and storing a key for opening the document when one or more document access rules from the data set are met; releasing the key to open the document to one or more users in response to a request from a user which meets the one or more document access rules; and enabling the user to access the document.

The key may be requested by means of an authorization request, wherein the authorization request is generated at a viewer plug-in as the user attempts to open the document.

The data set may be created in the form of metadata. The data set may be stored in the document.

The document access rules may be based on one or more of list of a time, a date, a user access level, a trigger event or time, a user equipment, other user criteria, a start time or a finish time.

A user may be denied access to the document by preventing determination of the key when the document access rules are not met. Releasing the key may include transmitting the key to the user.

In another embodiment of the invention, a computer program product comprises a computer readable medium that includes program instructions for managing access to a document and implemented by a computer system. The program instructions include attempting to open the document by means of a document viewer; creating a data set representing one or more document access rules; sending an authorization request from the document viewer to an authorization server asking for permission to open the document; receiving a key generated by the authorization server if the request meets the one or more document access rules; and unlocking the document with the key to allow one or more users to view the document.

In another embodiment of the invention, a system for managing document access comprises a processor and a computer memory operatively coupled to the processor. The computer memory has disposed within it computer program instructions for creating a data set representing one or more document access rules; storing the document and the representative data set; determining and storing a key for opening the document when one or more document access rules from the data set are met; releasing the key to open the document to one or more users in response to a request from a user which meets the one or more document access rules; and enabling the user to access the document.

In one embodiment the system may further comprise a viewer plug-in for opening a document. The viewer plug-in has a data set representing one or more document access rules.

In one or more embodiments, the system may further comprise an authorization server. The viewer plug-in sends an authorization request to the authorization server. The authorization server sends a decrypt key for opening the document to the user if the authorization request meets one or more document access rules.

The details of one or more embodiments of the invention are set forth in the accompanying drawings and the description below. Other features of the invention will be apparent from the description and drawings and from the claims.

DETAILED DESCRIPTION

Exemplary methods, systems, and computer program products for managing access to documents are described with reference to the accompanying drawings. The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

One or more embodiments of the invention relate to methods, computer program products and apparatus for dynamic authorization of documents. This is based on an authorization plug-in for a document viewer (for example PowerPoint, Word and Acrobat reader etc), which will interact and extend any local authorization mechanism (for example password protection) associated with the document viewer.

The term document is intended to encompass all types of data which can be accessed and/or created by a user in a computer or programmable environment. This includes, without limitation, files, documents, data files, presentations, multimedia files, application files etc.

Figure 1:
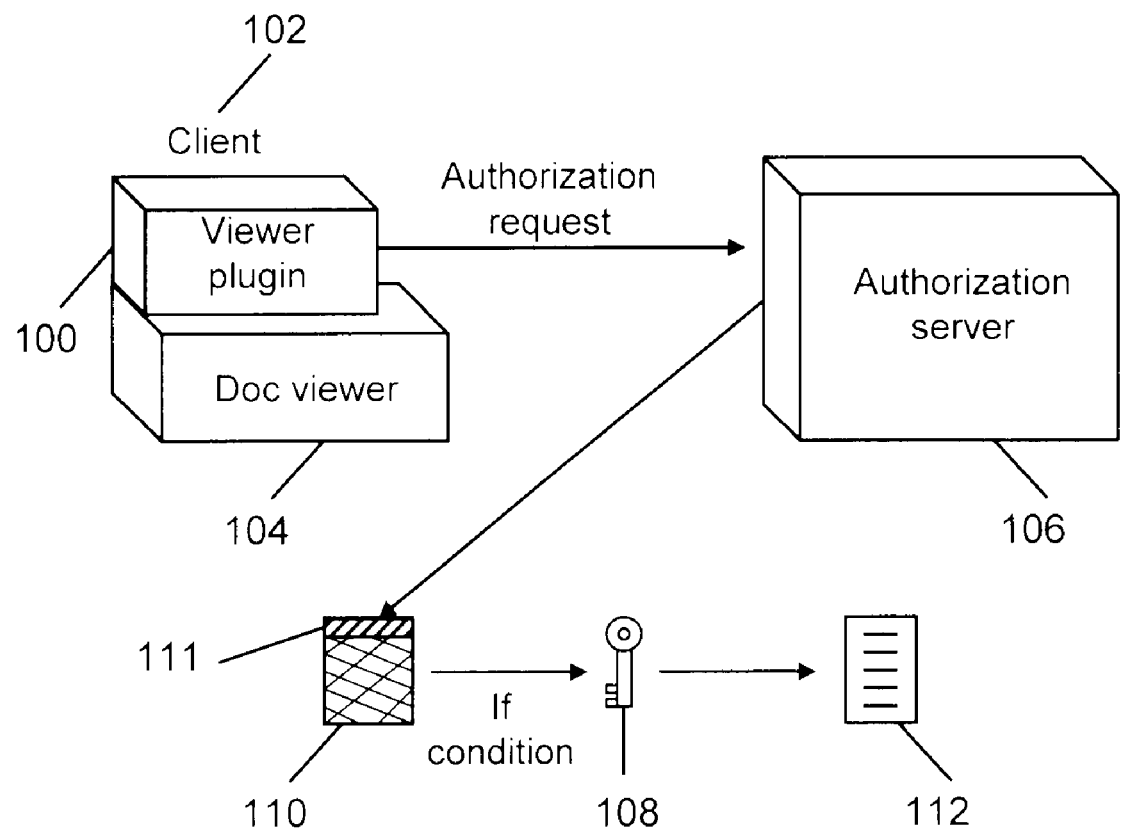
FIG. 1 is a schematic block diagram of one embodiment of the invention.

FIG. 1 shows a schematic diagram illustrating the elements of one embodiment of the system. An authorization plug-in 100 is located at the client 102 and is associated with a document viewer 104. The document viewer may be associated with Word, PowerPoint or any other document related application. The plug-in is capable of contacting an authorization server 106. The contact is made by means of an authorization request which requests information to decrypt a particular document or file. The decryption is based on a set of metadata stored in the document which will allow the document to be opened if the correct decrypt information is received. This will be described in greater detail below.

The authorization server may access the encrypted document 110 to retrieve from the document the encryption metadata (111) and process the authentication to grant or deny specific key information 108 to open document 112. The authorization server and the remote authorization service may be simultaneously accessed by a plurality of viewer plug-ins. The authorization server is configured to release the specific key information based on criteria stipulated by the document owner. For example, the criteria may be that the document is opened on or after a specific time. Obviously, other criteria may be used, for example access to the documents for users on a specified list: uses having different access levels and the document being available only to those above a certain access level etc. In one embodiment of the invention, a policy for access to a particular document is: "document with ID QWERTY-12345, and may be viewed by hosts in IBM.com domain starting from Dec. 4, 2007, noon GMT; and may be viewed by any host, starting from 5 p.m. GMT on the same day".

Figure 2:
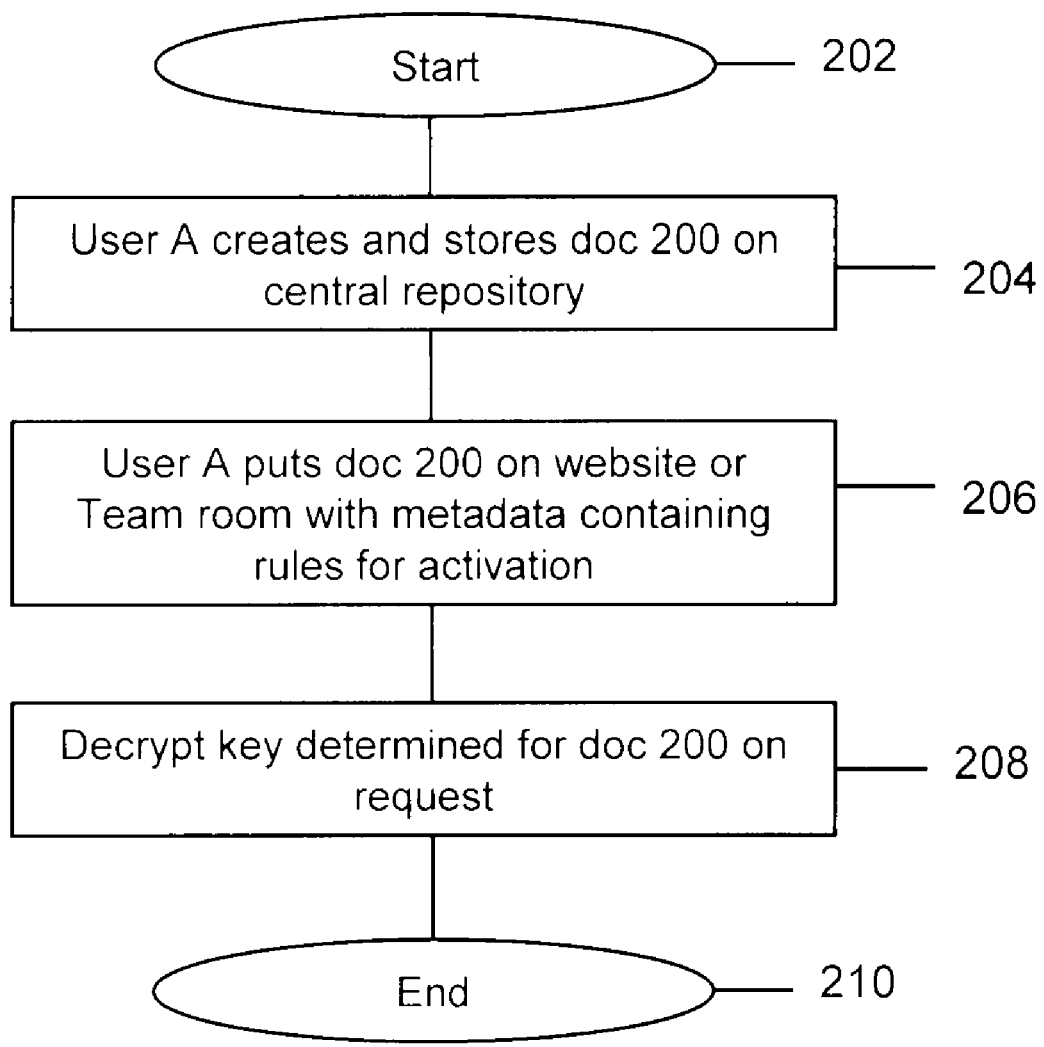
FIG. 2 is a flow chart in accordance with an embodiment of the invention.

Referring now to FIG. 2, in another embodiment of the invention, the method associated with creation and protection of the document starts at 202. At step 204 user A creates a document doc 200 that is to be presented at a meeting at a time t. User A stores doc 200 on the central repository but wants to prevent any other user from reading the document before the meeting. In order to prevent others from accessing doc 200 before time t, at step 206 user A may put doc 200 on a website or "team room" with metadata containing rules for activation. The metadata may be located either in the location where document is stored or in the document itself. The document may be encrypted and some of the metadata will describe the access rules. These metadata cannot be modified or changed to open the document using traditional security mechanisms such as hashing.

It will be appreciated that user A may store or put the document in a different location to the website or "team room" depending on the nature of the document and the purpose of the document. The authorization server is not typically updated each time a document is saved with a new authentication mechanism. The authorization server is responsible for collecting information received by the authorization plug-in and processing the request to provide or deny a decrypt key. The authorization viewer plug-in retrieves information from the system (e.g. the operating system, user information, local time etc.) along with the document metadata (that may be decryptable only by the authorization server) and sends a request to the server. The server will process the metadata and the local information and then grant or deny access as appropriate.

The authorization server may then create a decrypt key for doc 200 on request as illustrated in step 218. The process then ends at step 210.

Figure 3:
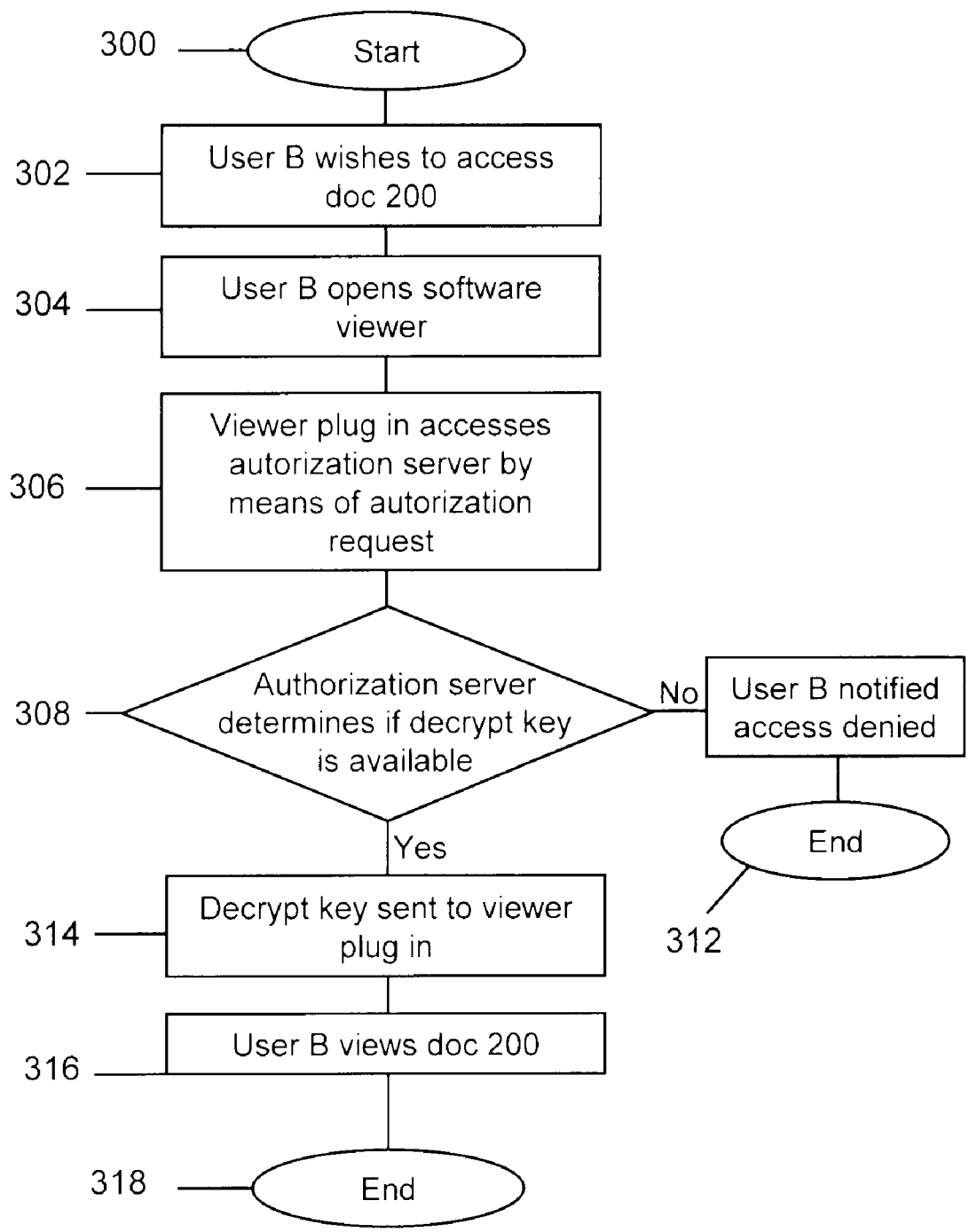
FIG. 3 is a flow chart in accordance with another embodiment of the invention.

Referring now to FIG. 3, in one embodiment of the invention, the method relating to access to document doc 200 starts at step 300. At step 302 user B wishes to access doc 200 and at step 304 user B opens the software viewer through which doc 200 could be viewed. At step 306 the viewer plug-in, in accordance with an embodiment of the invention, which is associated with the software viewer accesses the authorization server by means of an authorization request. The authorization server then determines at step 308 if local data associated with the client is trying to open the document (e.g. username, operating system, local time etc.) match the metadata constraints and if so provides a decrypted key for viewing doc 200. If the server identifies that the access request does not have the necessary security prerequisites (no) user B is notified at step 310 that access to doc 200 has been denied. The process then ends at step 312. In another embodiment of the invention, if the server identifies that the access request satisfies the necessary security prerequisites encoded into document metadata (yes) the decrypt key is sent to the viewer plug-in as illustrated in step 314. User B may then view doc 200 in step 316 and the process ends at step 318.

The communication between the authorization plug-in and the authorization web service may be secured using a public key embedded in the document meta data (secure signing) and a corresponding private key in the web service. These keys are specific to the document identity and or the metadata.

In one embodiment of the invention. User A may at any time change the protection afforded to the document. This can take the form of extending the protection through a longer time or may be to remove all protection as the document may now be freely used by anyone who wishes. If the protection is changed metadata will be updated or removed as the case may be. Each time a document is opened the metadata may be collected and sent to the server. If a document has no restrictions to access, the viewer plug-in is not invoked as the document viewer can automatically open the document without other restrictions.

One embodiment of the invention may be used in a communication meeting where a new organizational chart is to be presented. In such situations, it is essential that the new organizational chart is not disclosed prior to the meeting. However, it is important that when required the chart can be presented to an audience (often in many different locations) simultaneously. The author of the organizational chart may set a trigger time and date, at which the organizational chart can be accessed through means of the viewer plug-in. As a result, at the trigger time and date, the organizational chart can be accessed by means of the present invention and prior to that trigger no access can be achieved. The document access can also be linked to a calendar event so that, for example, a document will be activated when a communication meeting is held. In this way, for example, security metadata of the document can contain reference to a meeting identifier as the access constraint. In this way, the constraint will not be a static time but a dynamic one that is able to reflect any rescheduling of the meeting accordingly without requiring metadata update with a new scheduled time for the meeting.

In another embodiment of the invention, the document can be readable until a specific moment in time and then after that specific moment in time the document is considered to be out of date and reading must be prevented. In this situation, there is no protection at the start of the document existence, it is at a predetermined time period from that start point that the document becomes protected and inaccessible without the necessary decrypt key. The metadata will be appropriate to the requirement.

In yet another embodiment, it may be possible to use different triggers from time, for example using the activation of another document as the requirement that must be met. For example, the help document from Lotus Notes 7.5.2 can only be read in a situation where a certain fixpack is installed.

The document may include one or many different levels of activation or protection, for example certain users may have access to the document after a first time t1 and a second set of users can only have access to the document after a second time t2. There can clearly be many more than two levels of protection or activation.

One or more embodiments of the invention act at the application level by providing the current viewer with a plug-in that is able to contact a remote authentication or authorization server in order to access a specific document. The access may be controlled from the viewer plug-in and based on metadata and decryption associated with the metadata. There are many different parameters or criteria that can be used to control or manage the access, for example calendar events, time, authorization levels etc. In addition, these can be easily changed and updated should circumstances dictate this. If no changes are required the document merely moves from inaccessible to accessible (or vice versa) at a predetermined moment or criteria without additional access from the user who originated the document. The access to the document may be controlled by other global factors based on the status, for example, ready for review, approved, published or whatever. The activation for access without restriction can, in this situation, be attributed to a document once it has reached the published stage in all other static access is denied.

Since, in one embodiment of the invention, the authorization plug-in acts at the client side, all authorization access to a particular document happens in the same place. The viewer plug-in and the document viewer work in conjunction to authorize the user to view the document. This means user controlled access in accordance with the present invention and, for example, password access to the document viewer are handled at the client side.

Due to the fact that the data transmitted between the plug-in and the server are merely "an authorization request" or "an acknowledgement", security issues are improved. It is not necessary to send any additional information other than these two messages, which also means that bulk data transfer is avoided. It is only necessary for the authorization information to be protected and not the entire document during the transmission from plug-in to a server (and vice versa) as it is only this that is transmitted.

Embodiments of the invention may take the form of an entirely hardware embodiment, an entirely software embodiment or an embodiment containing both hardware and software elements. In one embodiment, the invention is implemented as a computer program product accessible from a computer-usable or computer-readable medium providing program code for use by or in connection with a computer or any instruction execution system. For the purposes of this description, a computer-usable or computer readable medium can be a non-transitory medium that contains or stores the program, or a transitory medium that communicates, propagates, or transports the program for use by or in connection with the instruction execution system, apparatus, or device.

The non-transitory medium can be an electronic, magnetic, optical, or semiconductor system (or apparatus or device). The transitory medium can be any propagation medium. Examples of a non-transitory computer-readable medium (a non-exhaustive list) include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should also be understood that the inventive concepts disclosed herein are capable of many modifications. To the extent such modifications fall within the scope of the appended claims and their equivalents, they are intended to be covered by this patent.

The invention claimed is:

1. A method for managing access to a first document, the method comprising:
   creating a first data set comprising metadata relating to the first document, the metadata relating to the first document comprising one or more document access rules for accessing the first document;
   creating a second data set comprising metadata relating to a second document, the metadata relating to the second document comprising one or more document access rules for accessing the second document;
   storing the first and second documents;
   storing the metadata relating to the first document and the metadata relating to the second document;
   determining and storing a key for accessing the first document on the condition that the one or more document access rules for accessing the first document are met;
   releasing the key to one or more users responsive to a request from at least one user of the one or more users and to a determination that the one or more document access rules for accessing the first document are met, the one or more document access rules for accessing the first document comprising a rule requiring that the one or more document access rules for accessing the second document are met; and
   enabling the one or more users to access the first document using the key.

2. The method of claim 1, further comprising requesting the key by means of an authorization request, wherein the authorization request is generated at a viewer plug-in as the at least one user attempts to open the document.

3. The method of claim 1, wherein the one or more document access rules for accessing the first document and/or the one or more document access rules for accessing the second document comprise one or more rules based on at least one of the following criteria: a time, a date, a user access level, a trigger event or time, a user equipment, other user criteria, a start time or a finish time.

4. The method of claim 1, further comprising denying access to the first document by preventing determination of the key when the one or more document access rules for accessing the first document are unmet.

5. The method claim 1, wherein the releasing the key comprises transmitting the key to the one or more users.

6. A computer program product comprising:
a non-transitory computer readable medium comprising computer program instructions for managing access to a first document and implemented by a computer system, the program instructions comprising instructions for:
attempting to open the first document by means of a document viewer;
creating a first data set comprising metadata relating to the first document, the metadata comprising one or more document access rules for accessing the first document;
creating a second data set comprising metadata relating to a second document, the metadata relating to the second document comprising one or more document access rules for accessing the second document;
storing the metadata relating to the first document and the metadata relating to the second document in a storage medium;
sending an authorization request from the document viewer to an authorization server asking for permission to open the first document;
receiving a key for accessing the first document generated by the authorization server responsive to a determination that the request meets the one or more document access rules for accessing the first document, the one or more document access rules for accessing the first document comprising a rule requiring that the one or more document access rules for accessing the second document are met; and
enabling access of the first document using the key to allow one or more users to view the first document.

7. The computer program product of claim 6, wherein the first document and the second document are stored in the storage medium.

8. The computer program product of claim 6, further comprising program instructions for deriving the one or more document access rules for accessing the first document from the first data set and program instructions for deriving the one or more document access rules for accessing the second document from the second data set.

9. The computer program product of claim 8, further comprising program instructions for basing one of more rules of the document access rules for accessing the first document and/or the document access rules for accessing the second document on at least one of the following criteria: a time, a date, a user access level, a trigger event or time, a user equipment, other user criteria, a start time or a finish time.

10. The computer program product of claim 6, further comprising program instructions for denying access to the first document by preventing determination of the key when the document access rules for accessing the first document are unmet.

11. The computer program product of claim 6, further comprising program instructions for releasing the key for accessing the first document.

12. The computer program product of claim 11, further comprising program instructions for transmitting the key to the one of more users.

13. A system for managing document access to a first document, the system comprising:
a processor; and
a computer memory operatively coupled to the processor; the computer memory having disposed therein computer program instructions for:
creating a first data set comprising metadata relating to the first document, the metadata comprising one or more document access rules for accessing the first document;
creating a second data set comprising metadata relating to a second document, the metadata relating to the second document comprising one or more document access rules for accessing the second document:
storing the first and second documents;
storing the metadata relating to the first document and the metadata relating to the second document;
determining and storing a key for accessing the first document
on the condition that the one or more document access rules for accessing the first document are met;
releasing the key to one or more users responsive to a request from at least one user of the one or more users and to a determination that the one or more document access rules for accessing the first document are met, the one or more document access rules for accessing the first document comprising a rule requiring that the one or more document access rules for accessing the second document are met; and
enabling the one or more users to access the first document using the key.

14. The system of claim 13, further comprising a viewer plug-in for opening the first document, the viewer plug-in storing the first data set.

15. The system of claim 13, further comprising an authorization server, wherein the viewer plug-in sends an authorization request to the authorization server.

16. The method of claim 1, further comprising:
initially storing the first document in an unencrypted state; and
encrypting the first document after a predetermined time period specified in the metadata relating to the first document has elapsed.

17. The computer program product of claim 6, the computer-readable medium further comprising:
program instructions for initially storing the first document in an unencrypted state; and
program instructions for encrypting the first document after a predetermined time period specified in the metadata relating to the first document has elapsed.

18. The system of claim 13, the memory having further disposed therein computer program instructions for:
initially storing the first document in an unencrypted state; and
encrypting the first document after a predetermined time period specified in the metadata relating to the first document has elapsed.

* * * * *